July 26, 1932.　　　　D. H. DAVIS　　　　1,868,971
AUXILIARY SUPPORT FOR SEMITRAILERS
Filed Feb. 6, 1931　　　2 Sheets-Sheet 1
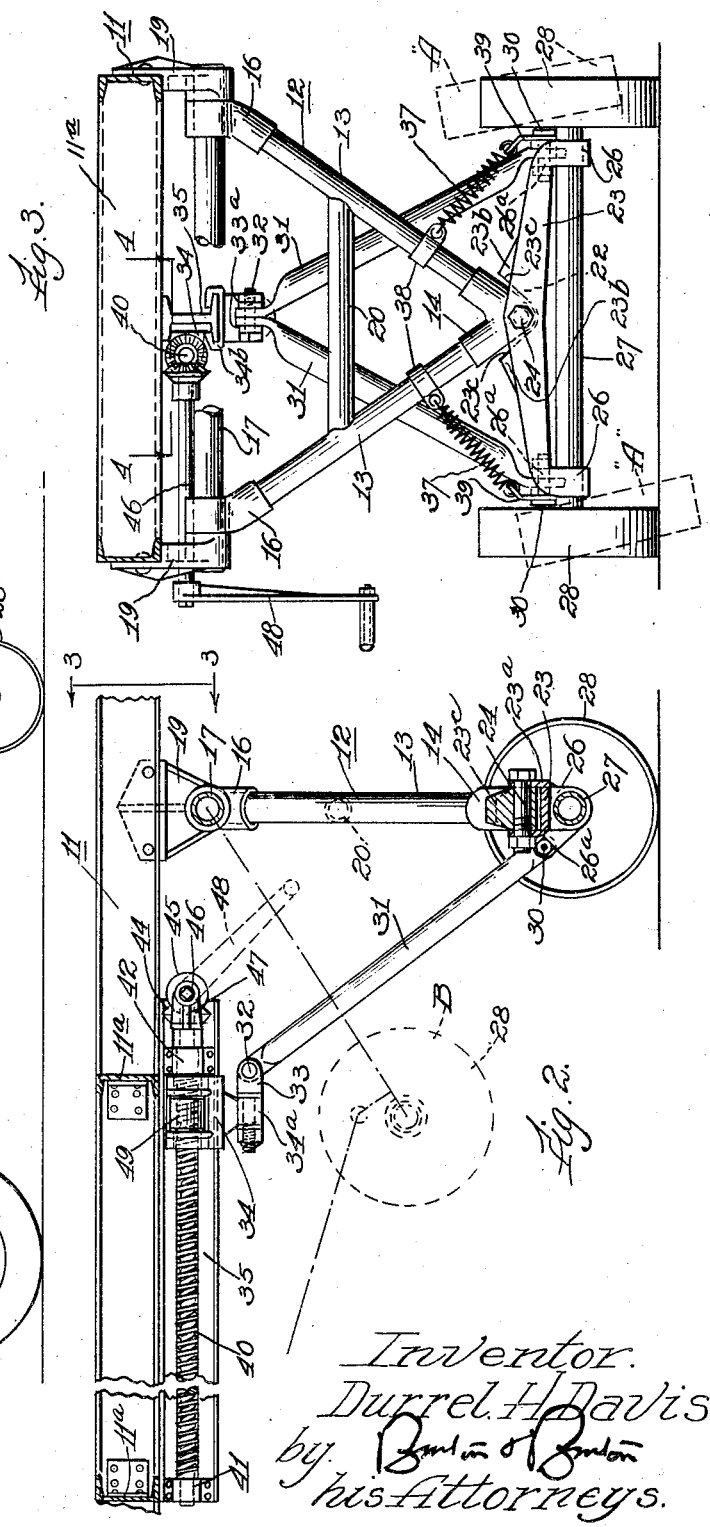
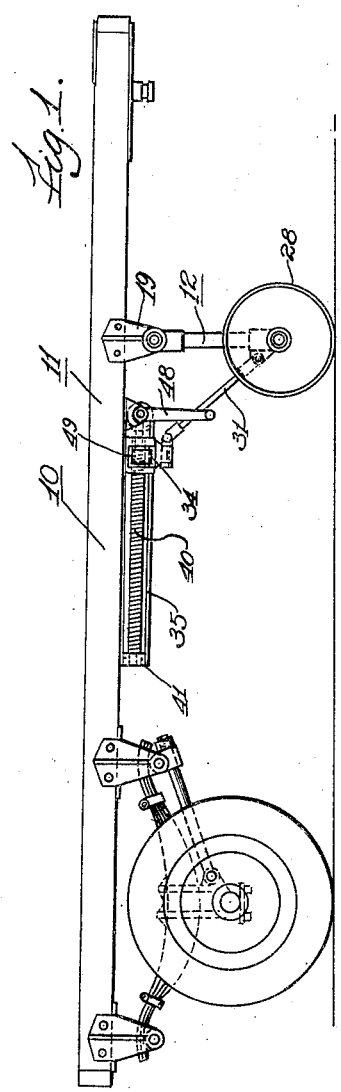
Inventor.
Durrel H. Davis.
by Burton & Burton
his Attorneys.

July 26, 1932.  D. H. DAVIS  1,868,971
AUXILIARY SUPPORT FOR SEMITRAILERS
Filed Feb. 6, 1931   2 Sheets-Sheet 2
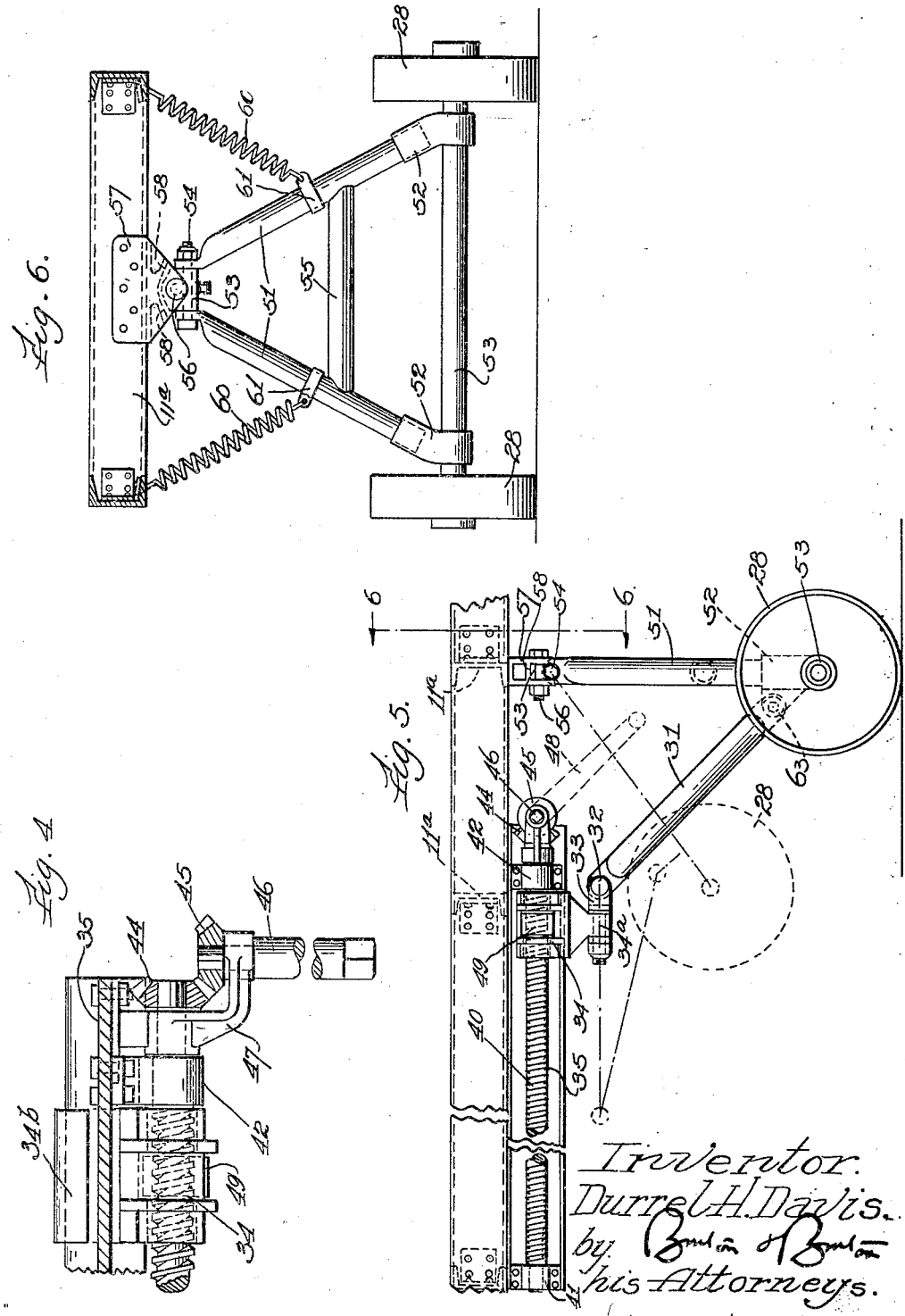

Patented July 26, 1932

1,868,971

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

AUXILIARY SUPPORT FOR SEMITRAILERS

Application filed February 6, 1931. Serial No. 513,807.

This invention relates to semi-trailers, and more particularly to a temporary load support for a semi-trailer adapted for sustaining the forward end of the trailer when it is disconnected from the tractor. The primary object of the present invention is to provide an improved temporary load support which is constructed and arranged to adapt itself to the contour of the ground or roadbed, and thus compensate for ordinary irregularities in the surface thereof. Another object is to provide a load support of this character, a simple and rugged construction which may be quickly and easily manipulated and which is adapted to withstand the abuse that such vehicles are normally accorded. The invention consists in certain features and elements of construction, herein shown and described, and as indicated by the claims.

In the drawings:

Figure 1 is a side elevation of a semi-trailer vehicle equipped with a temporary load support, embodying the present invention.

Figure 2 is an enlarged longitudinal sectional view of my improved temporary load support, shown in operative position.

Figure 3 is a transverse sectional view taken substantially as indicated at line, 3—3, on Figure 2.

Figure 4 is a top sectional view through a portion of the operating mechanism, taken substantially as indicated at line, 4—4, on Figure 3.

Figure 5 is a fragmentary view in side elevation of a vehicle equipped with a modified form of my invention, and Figure 6 is a transverse section taken substantially at the line, 6—6, on Figure 5.

Referring now in detail to the drawings, the semi-trailer which is indicated generally at 10, may be understood to be of a conventional construction, and includes a main frame, 11, to the forward end of which the temporary load support is connected. Said support constituting the present invention includes a supporting structure, 12, in the nature of a triangular frame which, as shown, is of tubular formation for the purpose of obtaining maximum strength for minimum weight of material. This triangular supporting structure includes a pair of downwardly converging members, 13, whose lower ends are rigidly connected in an angular fixture, 14, and whose upper ends are fitted with brackets, 16, mounted on a transversely extending member, 17, which serves to complete the triangular supporting structure. The brackets, 16, may be journaled on the elements, 17, but preferably are rigidly fixed thereto, and the extreme ends of the member, 17, project beyond said bracket fittings, 16, and are journaled in brackets, 19, which are secured to the sides of the semi-trailer frame, 11. To further reenforce this triangular frame structure a cross brace, 20, is provided which extends transversely, and has its ends brazed or welded for firm connection to the downwardly converging frame members, 13.

As may be seen in Figure 3 the triangular frame structure is so arranged that the lower fixture, 14, is located substantially at the longitudinal center of the vehicle, and this fixture, as shown, is disposed in a recessed pocket, 22, formed in a transversely extending beam, 23, which is pivotally connected to said fixture, 14, by means of a bolt, 24, which extends through the flanges, 23ª, formed by the side walls of the beam adjacent said recessed portion, 22. The opposite ends of said beam, 23, are formed to provide bearings, 26, for supporting the opposite ends of tubular axle, 27, on the outer ends of which there are shown ground-engaging elements preferably in the form of wheels, 28. At the rear side, the bearings, 26, are bifurcated to form clevises, 26ª, in which are pivotally secured by means of the horizontally extending bolts, 30, the flattened end portions of a pair of upwardly converging controlling links or struts, 31. The upper ends of said struts are also flattened and are pivotally connected, also at a transverse horizontal axis, by means of the pivot bolt, 32, with spaced apart lugs, 33ª, of the clevis bolt, 33. Said clevis bolt extends longitudinally through and is journaled in a boss formation, 34ª, formed on the under side of a longitudinally reciprocable carriage, 34, which is slidably mounted on a longitudinally extending centrally located I-beam or supporting frame element, 35, secured to the under side of the cross members, 11ª, of the trailer frame, 11.

Since the bolt, 33, is free to turn about a longitudinal axis and because the pivot axis of the bolt, 32, extends transversely thereto, the arrangement provides in effect a universal joint.

In order to insure that the ground-engaging elements, 28, are normally disposed in balanced relation to the triangular supporting structure, 12, and the main frame, 11, there is provided a pair of tension springs, 37, connected by means of clips, 38, to said members, 13, the opposite ends of said springs being connected by means of clips, 39, to the bolts, 30. It will be manifest that even if the springs, 37, were not employed, the construction normally tends to permit the transverse beam and the ground-engaging wheels to return to normal position just as soon as they are moved over substantially flat ground. Thus the springs, 37, tend normally to maintain the beam, 23, together with its ground-engaging elements, 28, in parallel relation to the semi-trailer frame, but will permit said ground-engaging wheels and beam to swivel as a unit about the pivot axis provided by said bolt, 24, so that the wheels may be vertically movable as indicated in dotted lines at A, in Figure 3, so as to accommodate themselves to ordinary variations in the contour of the ground surface and in effect provides a compensating action so that the semi-trailer main frame, together with its load is permitted to ride more evenly when it is shifted about, independent of its tractor. And manifestly when one of the wheels, 28, traverses a rise on the roadbed or the ground surface, the semi-trailer and the load is raised only one-half of the amount that it would normally be raised if such compensating construction had not been employed. The upper surface of the beam, 23, is preferably provided with a pair of upstanding bosses, 23ᵇ, which have stop shoulders, 23ᶜ, extending in parallel spaced relation to the adjacent sides of the fixture, 14, of the supporting structure so as to be engageable by said fixture in limiting the range of angular adjustment of said wheels and the beam as they swing as a unit about the axis of the bolt, 24.

The operating mechanism for shifting the temporary load supporting structure into and out of operating position includes a longitudinally extending screw, 40, journaled adjacent its ends in bearing brackets, 41 and 42, secured to said I-beam, 35. One end of said screw has rigidly associated therewith a bevel gear, 44, which is operatively meshed with a pinion, 45, rigidly carried on the inner end of a transversely extending operating shaft, 46, which is journaled in a supporting bracket, 47. The outer end of said shaft, 46, is preferably polygonal in shape for receiving the correspondingly formed socket of an operating handle, 48, disposed at the side of the trailer frame, 11. Mounted for longitudinal travel on said screw, 40, is an operating nut, 49, which is enclosed in a pocket formed in the carriage, 34, making the carriage movable with said nut. Said carriage, 34, is formed with a yoke, 34ᵇ, which is adapted to engage and embrace the lower flange of the I-beam, 35, for supporting the carriage as it is longitudinally moved by the travel of said nut along the screw, which is effected by rotation of the handle, 48, imparting rotation to the screw through the bevel gears, 44 and 45. It will be manifest that as the carriage, 34, moves longitudinally, its connection through the clevis bolt, 33, to the controlling links, 31, also directly controls the movement of the supporting structure, 12, with its ground-engaging wheels, 28, into and out of operative position. When the mechanism is in the position seen in Figure 2 the supporting structure is in substantially vertical position so that the trailer is entirely supported by said supporting mechanism at the forward end and the regular trailer wheels, A, at the rear. As is well understood, in coupling a trailer vehicle of this character to a tractor, the front end of the semi-trailer is raised slightly in the coupling operation, thus raising the ground-engaging wheels, 28, just clear of the ground so that the operating mechanism may be freely manipulated to swing the supporting structure rearwardly to raise the wheels to inoperative position, as indicated at B, in dotted lines in Figure 2.

In the modified construction shown in Figures 5 and 6, the triangular supporting structure is reversed, and includes a pair of upwardly converging members, 51, whose lower ends are secured in fixtures, 52, and support the transversely extending tubular shaft, 53, on the outer ends of which are journaled the supporting wheels, 28. The upper ends of said members, 51, are flattened and are pivotally connected to a universal pivot block, 53, by the bolt, 54, to permit swinging about a transverse horizontal axis, so that the supporting structure and the ground-engaging wheels may be moved to and from operative position. This triangular frame is reenforced by a transverse brace, 55, connecting the upwardly converging frame members, 51. The universal block, 51, is also pivoted by a bolt, 56, in the bracket, 57, carried on the cross member, 11ª, of the trailer frame, 11, which pivotal connection permits the entire triangular supporting structure, together with the ground-engaging wheels to swivel laterally as a unit about a longitudinal pivot axis, so that the ground-engaging wheels may freely adapt themselves to the contour of the ground. The bracket, 57, is preferably formed with stop surfaces indicated at 58, against which the adjacent surfaces of the universal pivot block, 53, may abut for limiting the angular range of movement of the supporting structure and the ground-engaging wheels. Tension springs, 60, omitted in Figure 5 but shown in Figure 6, are connected to the outside longitudinally extending members of the frame, 11, and their other ends are connected by means of clips, 61, to the frame members, 51, of the supporting structure, so as to exert substantially balanced forces for maintaining the axle, 53, and the wheels in normally parallel relation to the trailer frame while permitting the supporting structure to pivot yieldingly about the bolt, 56, when conditions require.

The rear side of the fixtures, 52, are pivotally connected by bolts, 63, to the upwardly extending controlling links, 31, which are connected to the operating mechanisms and manipulated thereby in substantially the same manner as that already described.

It is to be understood that in both forms of my invention the pivotal connections of the various members of the temporary supports as well as the portions of the members adjacent said connections are formed to provide adequate clearance and looseness so that the supports may readily and freely accommodate themselves to the ordinary differences in roadbed irregularities.

I claim:—

1. A temporary road support for a semi-trailer including a supporting structure movably connected to the semi-trailer frame, and a pair of transversely spaced ground engaging elements carried by said load supporting structure, said supporting structure being of triangular formation with the apex located adjacent the longitudinal central plane of the semi-trailer frame, and providing a pivotal connection whereby said ground engaging elements may swivel as a unit about said pivot for adapting themselves to roadbed irregularities.

2. A temporary load support for a semi-trailer, including a supporting structure movably connected to the trailer frame, said structure being of triangular formation and having side members converging downwardly, a transversely extending beam pivotally connected to said supporting structure at a longitudinal horizontal axis adjacent the apex of said downwardly converging members, and ground engaging elements supported adjacent the ends of said beam and adapted to swivel therewith about said longitudinal axis, whereby to accommodate roadbed irregularities.

3. In the construction defined in claim 2, said beam being formed with upwardly extending stop shoulders on opposite sides of the pivot, adapted to engage the downwardly converging members of the supporting structure for limiting the angular range of adjustment of its beam and the transversely spaced ground engaging elements about said longitudinal pivot.

4. A temporary load support for a semi-trailer, including a supporting structure movably connected to the semi-trailer frame, said supporting structures being of triangular formation including a pair of side members converging upwardly, means on the semi-trailer frame pivotally connecting the converging ends of said members to said frame for movement about a horizontal longitudinal axis, and a pair of transversely spaced ground engaging elements supported adjacent the lower ends of said side members of the supporting structure, whereby said supporting structure and the ground engaging elements may swivel as a unit about said longitudinal axis for adapting themselves to road-bed irregularities.

5. In the construction defined in claim 4, said means including a supporting bracket engaging said upwardly converging members of the supporting structure, and formed for limiting the angular range of movement of said supporting structure about said pivotal axis.

6. In the construction defined in claim 4, a pair of tension springs connected to said semi-trailer frame and to the upwardly converging members of the supporting structure for normally maintaining said supporting structure and ground engaging elements in balanced parallel relation to the trailer frame and for normally opposing swinging movement thereof about said pivotal axis.

7. In the construction defined in claim 4, the upper end of said supporting structure also being mounted for pivotal movement about a transverse horizontal axis for permitting swinging of said structure, together with the ground engaging elements, to and from operative position.

8. A temporary load support for a semi-trailer, including a supporting structure movably connected with the semi-trailer frame, and a pair of transversely spaced ground-engaging elements connected to the supporting structure, one of said connections being arranged to permit vertical adjustment of said ground-engaging elements as a unit by swinging about a longitudinal horizontal axis to compensate for roadbed irregularities, and means for shifting the supporting structure and said ground-engaging elements into and out of operative position, said means including a longitudinally reciprocable part supported on the semi-trailer frame, and linkage connecting said part to the supporting structure, said linkage being attached to said part for swinging movement about a substantially horizontal longitudinal axis.

9. In the combination defined in claim 8, said longitudinal axis at which said linkage is swivelly attached to said part being approximately aligned with the longitudinal axis about which the ground-engaging elements are mounted to swing in their compensating adjustment.

DURREL H. DAVIS.